United States Patent
Vos

(10) Patent No.: US 10,208,882 B2
(45) Date of Patent: Feb. 19, 2019

(54) MAGNETIC PRESSURE PULSE ATTENUATION

(71) Applicant: Halliburton Energy Services, Inc., Houston, TX (US)

(72) Inventor: Andrew D. Vos, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 218 days.

(21) Appl. No.: 14/787,910

(22) PCT Filed: Aug. 22, 2013

(86) PCT No.: PCT/US2013/056114
§ 371 (c)(1),
(2) Date: Oct. 29, 2015

(87) PCT Pub. No.: WO2015/026347
PCT Pub. Date: Feb. 26, 2015

(65) Prior Publication Data
US 2016/0097479 A1   Apr. 7, 2016

(51) Int. Cl.
*F16L 55/04* (2006.01)
*F04B 17/03* (2006.01)
*F04B 17/04* (2006.01)

(52) U.S. Cl.
CPC .............. *F16L 55/04* (2013.01); *F04B 17/03* (2013.01); *F04B 17/042* (2013.01)

(58) Field of Classification Search
CPC ...................................................... F16L 55/04
(Continued)

(56) References Cited

U.S. PATENT DOCUMENTS

| 912,502 | A | * | 2/1909 | Squires | ........................... 138/31 |
| 1,169,250 | A | * | 1/1916 | Fulton | ..................... F16L 55/04 |
| | | | | | 137/207 |

(Continued)

FOREIGN PATENT DOCUMENTS

| JP | 8-93984 | * | 4/1996 | .............. F16L 55/04 |
| JP | 2000-65280 | * | 3/2000 | .............. F16L 55/04 |

(Continued)

OTHER PUBLICATIONS

"International Application Serial No. PCT/US2013/056114, International Search Report dated May 7, 2014", 3 pgs.

(Continued)

*Primary Examiner* — James Hook
(74) *Attorney, Agent, or Firm* — Chamberlain Hrdlicka

(57) ABSTRACT

A magnetic pressure pulse attenuator can include a variable volume and at least two magnetic devices. A magnetic force between the magnetic devices varies in response to a pressure change in the volume. A fluid system can include a fluid volume with a variable pressure therein, and a magnetic pressure pulse attenuator including a variable volume in communication with the fluid volume. The variable volume can vary in response to a pressure variation, and the attenuator can further include a magnetic actuator which increases a magnetic force in response to an increase in the pressure. A method of attenuating pressure pulses in a fluid system can include connecting a variable volume of a magnetic pressure pulse attenuator to a fluid volume of the fluid system, the attenuator including a magnetic actuator which generates a magnetic force, and the force increasing in response to a pressure increase in the variable volume.

19 Claims, 4 Drawing Sheets

(58) Field of Classification Search
USPC .................................................. 138/30, 31
See application file for complete search history.

(56) References Cited

U.S. PATENT DOCUMENTS

| | | | | |
|---|---|---|---|---|
| 1,536,531 A * | 5/1925 | Schermann | ............. | F16L 55/05 138/31 |
| 2,497,020 A * | 2/1950 | Singer | ..................... | F16L 55/04 138/26 |
| 5,205,326 A | 4/1993 | Paley et al. | | |
| 5,265,639 A | 11/1993 | Tobia et al. | | |
| 5,301,783 A * | 4/1994 | Malloy | .................. | F16D 25/14 138/31 |
| 5,483,994 A * | 1/1996 | Maurer | ............... | G01L 19/0645 138/30 |
| 5,664,848 A * | 9/1997 | Muraski | .................... | B60T 8/00 138/31 |
| 6,076,557 A * | 6/2000 | Carney | .................. | F15B 1/103 138/30 |
| 6,312,232 B1 * | 11/2001 | Mori | ................. | B60H 1/00571 138/31 |
| 6,347,841 B1 * | 2/2002 | Kim | ........................ | B60T 17/04 138/31 |
| 6,607,176 B1 | 8/2003 | Mayr et al. | | |
| 6,837,477 B2 | 1/2005 | Mayr et al. | | |
| 8,215,724 B2 * | 7/2012 | Aoba | ...................... | B60T 8/368 138/31 |
| 2002/0003327 A1 * | 1/2002 | Enoki | ..................... | F16F 6/005 267/136 |
| 2002/0117223 A1 * | 8/2002 | Henry | ................... | F16L 55/053 138/30 |
| 2008/0074083 A1 * | 3/2008 | Yarger | ................. | H01M 6/5033 320/137 |
| 2010/0288388 A1 * | 11/2010 | Barale | .................... | B62D 5/062 138/31 |
| 2010/0306934 A1 * | 12/2010 | Headstrom | .......... | A61C 17/221 15/22.2 |
| 2011/0000565 A1 * | 1/2011 | Becker | .................... | F15B 15/12 138/31 |
| 2011/0303864 A1 * | 12/2011 | Lee | ........................... | F16K 3/03 251/337 |
| 2012/0312406 A1 * | 12/2012 | Warnke | ................... | B23P 11/00 138/31 |
| 2015/0268691 A1 * | 9/2015 | Schaub | .................... | G05G 5/03 74/471 XY |

FOREIGN PATENT DOCUMENTS

| | | |
|---|---|---|
| KR | 1020010076809 A | 8/2001 |
| WO | WO-2015026347 A1 | 2/2015 |

OTHER PUBLICATIONS

"International Application Serial No. PCT/US2013/056114, Written Opinion dated May 7, 2014", 9 pgs.

* cited by examiner

MAGNETIC PRESSURE PULSE ATTENUATION

PRIORITY APPLICATION

This application is a U.S. National Stage Filing under 35 U.S.C. 371 from International Application No. PCT/US2013/056114, filed 2013 Aug. 22; and published as WO 2015/026347 on 2015 Feb. 26; which application and publication are incorporated herein by reference in their entirety.

TECHNICAL FIELD

This disclosure relates generally to equipment utilized and operations performed with hydraulic circuits and, in one example described below, more particularly provides for magnetic pressure pulse attenuation.

BACKGROUND

Erratic pressure measurements can frequently be caused by pumps and other equipment. The erratic pressure measurements can be exacerbated by a small volume present in a fluid circuit. For example, movement of a valve closure member (such as, a needle or poppet) can have a dramatic effect on pressure in a relatively small volume fluid circuit.

Therefore, it will be appreciated that improvements are continually needed in the art of mitigating undesired pressure variations. Such improvements may be useful whether or not the pressure variations are due to operation of certain equipment (such as, a pump or a valve), and whether or not a relatively small volume or a fluid circuit is used.

DETAILED DESCRIPTION

Figure 1:
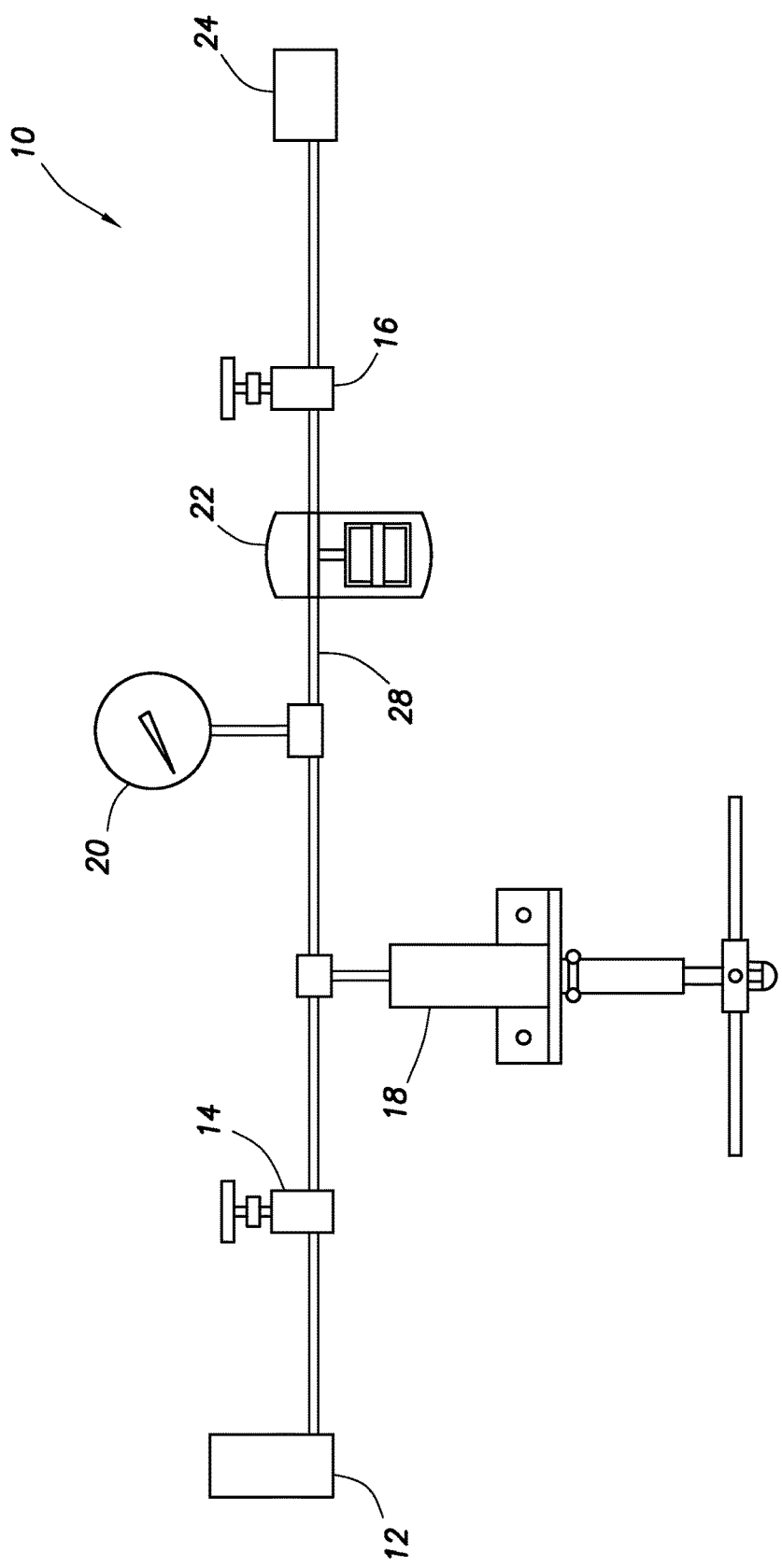
FIG. 1 is a representative partially cross-sectional view of a fluid system and associated method which can embody principles of this disclosure.

Representatively illustrated in FIG. 1 is a fluid system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, the system 10 includes a fluid reservoir 12, valves 14, 16, a hydraulic intensifier or pump 18, a pressure gauge or sensor 20, a magnetic pressure pulse attenuator 22, a pressure line 28, and a pressure vessel, component or device 24 to which pressure is applied using the system. Typically, in such a system, an objective is to test the device 24 by, at least in part, applying increased pressure and/or flow to the device, for example, to determine whether the device can withstand the pressure, to determine how the device functions with the pressure and/or flow applied thereto, or to determine one or more characteristics of the device (such as, permeability, compressibility, etc.).

However, it should be clearly understood that the scope of this disclosure is not limited to any particular objectives or purposes for applying increased or decreased pressure and/or flow to a vessel, component or device using a fluid system. In addition, the scope of this disclosure is not limited to any particular configuration of a fluid system or elements thereof. Instead, the principles of this disclosure are applicable to a wide variety of different fluid systems utilized for a wide variety of different purposes.

The fluid system 10 of FIG. 1 has a relatively small fluid volume. As a result, without the attenuator 22, small changes in that fluid volume can produce relatively large changes in pressure. For example, operation of either of the valves 14, 16 or the pump 18 can produce large pressure variations.

When the pump 18 is operated, measurements taken using the sensor 20 can be very erratic if the attenuator 22 is not used, making it difficult or impossible to determine what pressure the device 24 is exposed to during the pump's operation. Furthermore, it can be difficult to control the pressure that is applied to the device 24, if the attenuator 22 is not used.

The magnetic pressure pulse attenuator 22 is included in the system 10 in order to mitigate such undesired pressure variations in the system. As described more fully below, the attenuator 22 uses a magnetic force to control how a variable volume changes in response to the pressure variations.

Figure 2A:
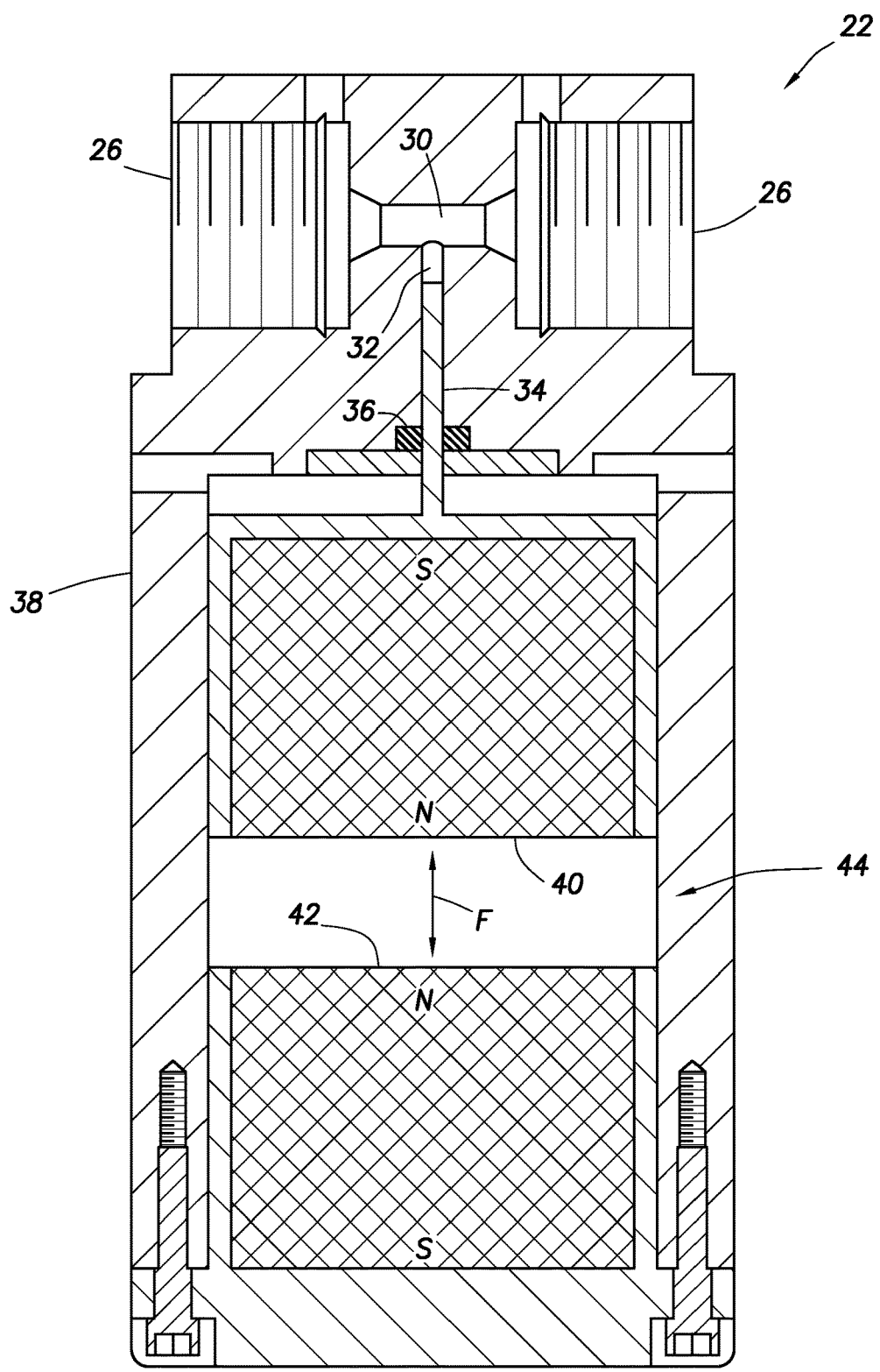
FIGS. 2A & B are representative enlarged scale cross-sectional views of a magnetic pressure pulse attenuator which can embody the principles of this disclosure.

Referring additionally now to FIGS. 2A & B, enlarged scale cross-sectional views of the magnetic pressure pulse attenuator 22 are representatively illustrated, apart from the remainder of the system 10. However, it should be understood that it is not necessary for the attenuator 22 to be used only with the system 10. The attenuator 22 can be used with any fluid system, in keeping with the scope of this disclosure.

In FIGS. 2A & B, it may be seen that the attenuator 22 includes pressure ports 26 for sealingly connecting the attenuator in the pressure line 28 (see FIG. 1) of the system 10. In this manner, a fluid volume 30 between the ports 26 becomes part of the fluid volume of the system 10.

Another variable volume 32 of the attenuator 22 is in fluid communication with the volume 30. Note that the variable volume 32 is smaller in FIG. 2A as compared to in FIG. 2B.

A structure 34 (such as, a rod or piston) is reciprocably and sealingly disposed in the variable volume 32. A seal 36 (such as, an o-ring) seals about the structure 34. In the FIGS. 2A & B example, the seal 36 is disposed in a body 38 of the attenuator 22, but in other examples the seal could be carried on the structure 34. Thus, the scope of this disclosure is not limited to any particular configuration or arrangement of components in the attenuator 22.

A magnetic device 40 is connected or attached to the structure 34. Another magnetic device 42 is connected or attached to the body 38. The magnetic devices 40, 42 comprise a magnetic actuator 44 for applying a biasing force to the structure 34, in opposition to a force produced by pressure in the volumes 30, 32 acting on the structure.

In the FIGS. 2A & B example, the magnetic devices 40, 42 comprise permanent magnets. In other examples, other types of magnetic devices capable of generating, or being influenced by, a magnetic field to thereby produce a magnetic force can be used. For example, an electromagnet may be used, or a ferrous material in combination with a magnetic device that generates a magnetic field can be used. The scope of this disclosure is not limited to use of any particular type of magnetic device.

In the FIGS. 2A & B example, North poles of the magnetic devices 40, 42 are oriented so that they face toward each other. This causes a repulsive magnetic force F to be generated between the magnetic devices 40, 42.

Note that the magnetic force F increases as a distance between the magnetic devices 40, 42 decreases. Thus, the magnetic force F is greater in FIG. 2B as compared to in FIG. 2A.

In other examples, South poles of the magnetic devices 40, 42 could be oriented facing toward each other, or the attenuator 22 could be configured so that an attractive (instead of repulsive) magnetic force is used to control displacement of the structure 34. Thus, the scope of this disclosure is not limited to any particular arrangement of the magnetic devices 40, 42, or to use of any particular type of magnetic force.

Figure 2B:
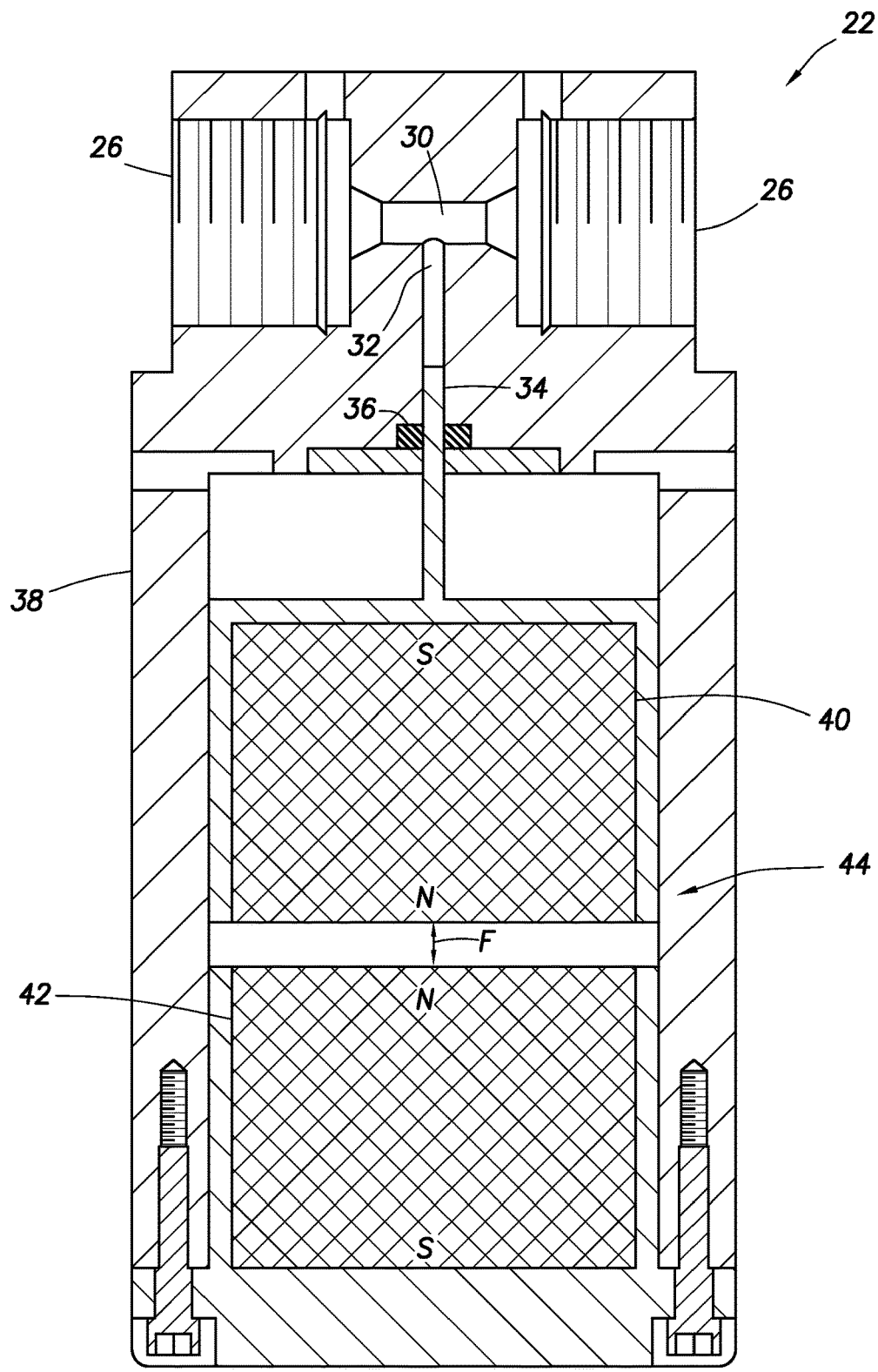

In FIG. 2B, an increased pressure in the fluid volume 30 (and in the variable volume 32) has caused the structure 34 to displace downward (as viewed in the figure), thereby increasing the variable volume. This increased volume helps to attenuate a sharp pressure increase. Because the magnetic force F increases as the magnetic device 40 displaces toward the magnetic device 42, a larger pressure increase will be required for a given displacement of the structure 34.

In FIG. 2A, a decreased pressure in the fluid volume 30 (and in the variable volume 32) has caused the structure 34 to displace upward (as viewed in the figure), thereby decreasing the variable volume. This decreased volume helps to attenuate a sharp pressure decrease. Because the magnetic force F decreases as the magnetic device 40 displaces away from the magnetic device 42, a smaller pressure decrease will be required for a given displacement of the structure 34.

Figure 3:
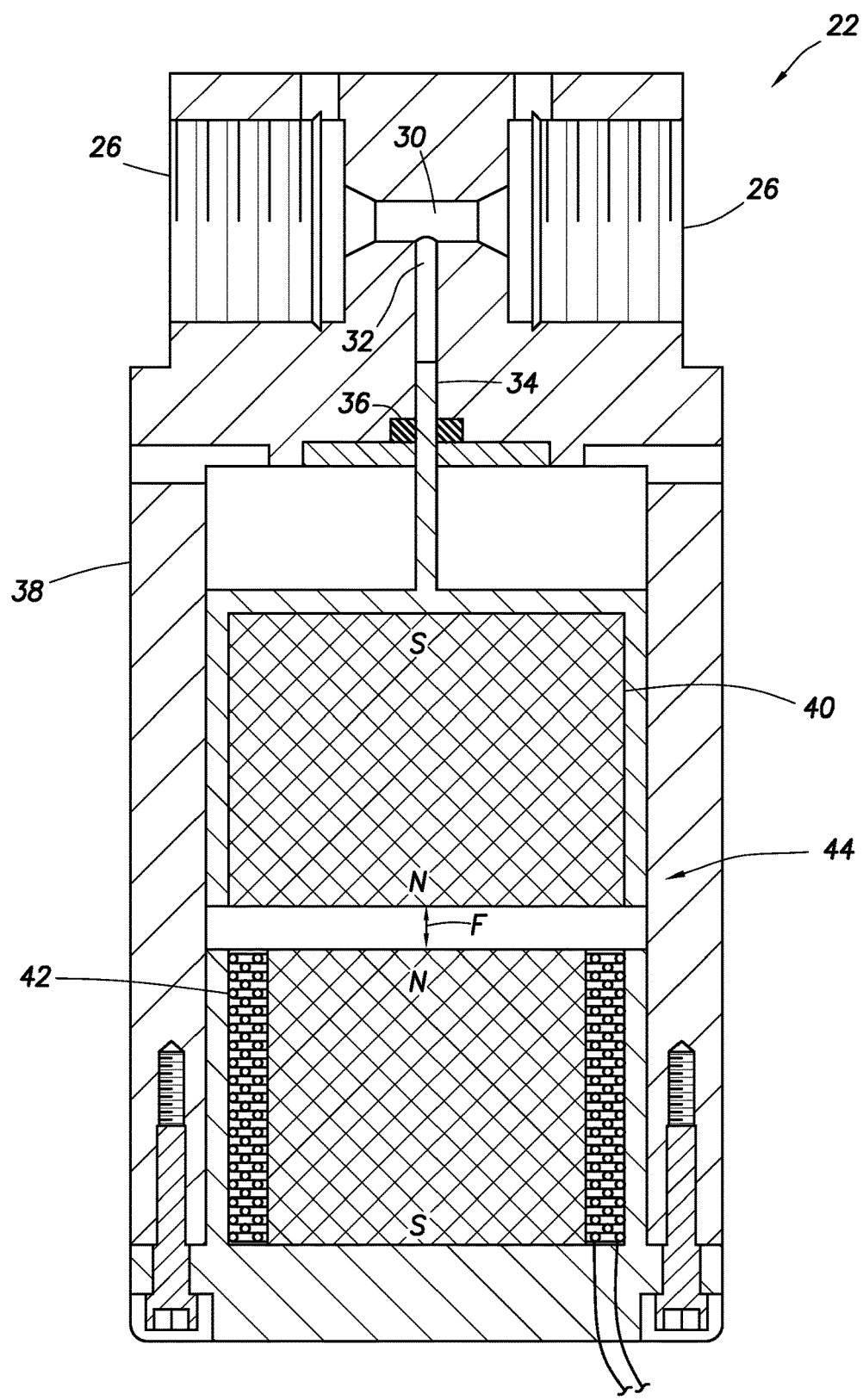
FIG. 3 is a representative cross-sectional view of another example of the magnetic pressure pulse attenuator.

Referring additionally now to FIG. 3, another example of the magnetic pressure pulse attenuator 22 is representatively illustrated. In this example, the magnetic device 42 is in the form of an electromagnet.

The FIG. 3 example operates substantially the same as the FIGS. 2A & B example. However, use of the electromagnet in the FIG. 3 example provides for adjustment of the magnetic force F, if desired.

For example, current flow through the electromagnet could be increased, in order to increase the magnetic force F. An increased magnetic force F could be desired if pressure in the fluid volume 30 is increased.

In the above examples, the magnetic force F and a pressure area (e.g., cross-sectional area) of the structure 34 can be selected and designed, so that the structure is positioned appropriately between its travel limits when the fluid volume 30 is at an expected operating pressure. In this manner, pressure increases in the fluid volume 30 can be attenuated by displacement of the structure 34 in one direction, and pressure decreases can be attenuated by displacement of the structure in an opposite direction. However, the scope of this disclosure is not limited to any particular position of the structure 34 when the fluid volume 30 is at operating pressure.

It may now be fully appreciated that the above disclosure provides significant advancements to the art of attenuating pressure pulses in fluid systems. In examples described above, a magnetic force F is used to bias a structure 34, so that pressure variations in the fluid volume 30 are accommodated by corresponding variations in the variable volume 32.

A magnetic pressure pulse attenuator 22 is provided to the art by the above disclosure. In one example, the attenuator 22 comprises a variable volume 32, and at least first and second magnetic devices 40, 42. A magnetic force F between the first and second magnetic devices 40, 42 varies in response to a change in pressure in the variable volume 32.

The first and second magnetic devices 40, 42 may repulse each other. In other examples, the magnetic devices 40, 42 may attract each other.

A structure 34 may be displaced by at least one of the first and second magnetic devices 40, 42. The volume 32 can vary in response to displacement of the structure 34. The structure 34 may be sealingly inserted into the variable volume 32.

The first and second magnetic devices 40, 42 may comprise a permanent magnet. At least one of the first and second magnetic devices 40, 42 may comprise an electromagnet.

The first and second magnetic devices 40, 42 may be isolated from pressure in the variable volume 32 (e.g., by the seal 36).

The magnetic force F may result from similar poles of the first and second magnetic devices 40, 42 being oriented toward each other.

A fluid system 10 is also described above. In one example, the fluid system 10 can comprise a fluid volume 30 with a variable pressure therein, and a magnetic pressure pulse attenuator 22 including a variable volume 32 in communication with the fluid volume 30. The variable volume 32 can vary in response to a variation in the pressure. The attenuator 22 can also include a magnetic actuator 44 which increases a magnetic force F in response to an increase in the pressure.

The variable volume 32 may increase in response to the increase in the pressure. The magnetic actuator 44 may be isolated from pressure in the variable volume 32.

The magnetic actuator 44 may include at least first and second magnetic devices 40, 42.

Also described above is a method of attenuating pressure pulses in a fluid system 10. In one example, the method comprises: connecting a variable volume 32 of a magnetic pressure pulse attenuator 22 to a fluid volume 30 of the fluid system 10, the attenuator 22 including a magnetic actuator 44 which generates a magnetic force F; and the magnetic force F increasing in response to an increase in pressure in the variable volume 32.

The magnetic force F may increase in response to an increase in the variable volume 32.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A magnetic pressure pulse attenuator for attenuating pressure of a fluid in a fluid system, comprising:
    a first pressure port and a second pressure port in fluid communication with a volume such that the fluid is open to flow between the first and second pressure ports through the volume;
    a variable volume in fluid communication with the volume and having a constant cross-sectional area; and
    first and second magnetic devices oriented such that only similar poles of the first and second magnetic devices face each other to cause a repulsive magnetic force between the first and second magnetic devices, a cross-sectional area of the first magnetic device and a cross-sectional area of the first magnetic device being greater than the cross-sectional area of the variable volume; and
    wherein the first and second magnetic devices are movable with respect to each other to adjust the variable volume in response to a change in pressure of the fluid in the volume so as to attenuate the change in pressure of the fluid in the volume flowing between the first and second pressure ports.

2. The magnetic pressure pulse attenuator of claim 1, wherein a structure is displaced by at least one of the first and second magnetic devices, and wherein the variable volume varies in response to displacement of the structure.

3. The magnetic pressure pulse attenuator of claim 2, wherein the structure is sealingly inserted into the variable volume.

4. The magnetic pressure pulse attenuator of claim 1, wherein the first and second magnetic devices comprise permanent magnets.

5. The magnetic pressure pulse attenuator of claim 1, wherein at least one of the first and second magnetic devices comprises an electromagnet.

6. A fluid system for flowing a fluid, comprising:
    a first fluid volume; and
    a magnetic pressure pulse attenuator in fluid communication with the first fluid volume, including:
        a first pressure port and a second pressure port in fluid communication with a second fluid volume such that the fluid is open to flow between the first and second pressure ports through the second fluid volume;
        a variable volume in fluid communication with the second fluid volume and having a constant cross-sectional area;
        a magnetic actuator which operates using a magnetic force to adjust the variable volume in response to a change in pressure of the fluid in the second fluid volume and attenuate the change in pressure of the fluid in the second fluid volume flowing between the first and second pressure ports, the magnetic actuator comprising first and second magnetic devices oriented such that only similar poles of the first and second magnetic devices face each other to cause the magnetic force, a cross-sectional area of the first magnetic device and a cross-sectional area of the second magnetic device being greater than the cross-sectional area of the variable volume.

7. The fluid system of claim 6, wherein the variable volume increases in response to an increase in the pressure.

8. The fluid system of claim 6, wherein a structure is displaced by the magnetic actuator, and wherein the variable volume varies in response to displacement of the structure.

9. The fluid system of claim 8, wherein the structure is sealingly inserted into the variable volume.

10. The fluid system of claim 6, wherein the magnetic actuator includes at least first and second magnetic devices.

11. The fluid system of claim 10, wherein the first and second magnetic devices repulse each other.

12. The fluid system of claim 10, wherein the first and second magnetic devices comprise permanent magnets.

13. The fluid system of claim 10, wherein at least one of the first and second magnetic devices comprises an electromagnet.

14. A method of attenuating pressure pulses of a fluid in a fluid system, the method comprising:
    flowing the fluid through a volume of a magnetic pressure pulse attenuator;
    communicating fluid pressure from the volume with a variable volume of the magnetic pressure pulse attenuator having a constant cross-sectional area while fluid is flowing through the volume, the magnetic pressure pulse attenuator including a magnetic actuator that generates a magnetic force to adjust the size of the variable volume, the magnetic actuator comprising first and second magnetic devices oriented such that only similar poles of the first and second magnetic devices face each other to cause a magnetic force, a cross-sectional area of the first magnetic device and a cross-sectional area of the second magnetic device being greater than the cross-sectional area of the variable volume; and
    attenuating changes in pressure in the volume by adjusting the variable volume with the magnetic actuator in response to the change in pressure.

15. The method of claim 14, wherein the magnetic force increases in response to an increase in the variable volume.

16. The method of claim 14, wherein a structure is displaced by the magnetic actuator, and wherein the variable volume varies in response to displacement of the structure.

17. The method of claim 16, wherein the structure is sealingly inserted into the variable volume.

18. The method of claim 14, wherein the first and second magnetic devices comprise permanent magnets.

19. The method of claim 14, wherein at least one of the first and second magnetic devices comprises an electromagnet.

\* \* \* \* \*